United States Patent [19]

Simonett

[11] Patent Number: 5,655,696
[45] Date of Patent: Aug. 12, 1997

[54] ADJUSTABLE BICYCLE RACK

[76] Inventor: Bernard Theodore Simonett, 4071 Big Horn Rd., No. 13B, Vail, Colo. 81657

[21] Appl. No.: 442,966

[22] Filed: May 17, 1995

[51] Int. Cl.$^6$ .................................................. B62J 7/04
[52] U.S. Cl. .......................... 224/454; 224/457; 224/460; 224/452; D12/407; 403/378
[58] Field of Search .................... 224/30 R, 32 A, 224/37, 38, 39, 40, 441, 443, 444, 446, 452, 453, 454, 457, 33 R, 31; D12/407; 403/378, 379

[56] References Cited

U.S. PATENT DOCUMENTS

| D. 285,426 | 9/1986 | Blackburn et al. | D12/407 |
|---|---|---|---|
| D. 324,016 | 2/1992 | Hsu | D12/407 |
| D. 336,877 | 6/1993 | Fenton | D12/407 |
| 2,536,570 | 1/1951 | Rehn | 224/446 |
| 2,776,790 | 1/1957 | Zbikowski | 224/443 |
| 4,536,037 | 8/1985 | Rink | 403/378 |
| 4,760,943 | 8/1988 | Bass et al. | 224/39 |
| 4,776,639 | 10/1988 | Braun et al. | 403/378 |
| 5,094,373 | 3/1992 | Lovci | 224/521 |
| 5,199,414 | 4/1993 | McMillon | 126/99 R |
| 5,217,149 | 6/1993 | Simonett | 224/40 |
| 5,222,639 | 6/1993 | Simonett | 224/40 |

FOREIGN PATENT DOCUMENTS

| 243499 | 12/1946 | France | 224/32 R |
|---|---|---|---|
| 316315 | 11/1956 | France | 224/39 |
| 955200 | 12/1956 | Germany | 224/39 R |
| 2834439 | 2/1980 | Germany | 224/32 A |
| 3327982 | 3/1985 | Germany | 224/30 R |
| 7609357 | 8/1976 | Netherlands | 224/39 R |
| 8702709 | 6/1989 | Netherlands | 224/32 A |
| 102739 | 10/1941 | Sweden | 224/40 |
| 118445 | 3/1947 | Sweden | 224/37 |
| 121444 | 4/1948 | Sweden | 224/32 A |
| 121877 | 6/1948 | Sweden | 224/32 A |
| 243499 | 12/1946 | Switzerland | 224/32 R |
| 270732 | 9/1950 | Switzerland | 224/32 A |
| 316315 | 9/1956 | Switzerland | 224/39 R |

*Primary Examiner*—Henry J. Recla
*Assistant Examiner*—Gregory M. Vidovich
*Attorney, Agent, or Firm*—Paul M. Craig, Jr.

[57] ABSTRACT

A bicycle rack with a substantially planar carrier surface extending in the longitudinal direction, longitudinal frame members, whereby the carrier surface is adapted to be modified at least in one of size and configuration by the use of cross rail assemblies forming tubular members and extending substantially transversely to the longitudinal direction and of support arms rotatable as well as axially adjustable within the tubular members; the support arms can be held fast in a preselected axial and rotatable position, whereby the frame members are so arranged that the maximum height of the cross rail assemblies lies substantially within the plane of the carrier surface.

58 Claims, 5 Drawing Sheets

ADJUSTABLE BICYCLE RACK

FIELD OF THE INVENTION

The present invention relates to a bicycle rack, and more particularly to a bicycle rack which can be easily adjusted in size and configuration to conform to the item to be carried.

BACKGROUND OF THE INVENTION

An attachment for existing bicycle racks to permit the use of expandable and rotatable arms was disclosed in my prior U.S. Pat. Nos. 5,222,639 and 5,217,149. The use of the rotatable and axially movable arms extending from opposite sides of a pair of tubular members as disclosed in these patents has proved commercially successful. However, the various embodiments of the attachments disclosed in the patents posed some problems as regards cost-effective mass production, assembly and use. Once a fastening screw normally holding a support arm in its selected position was loosened, there existed the danger of inadvertent complete pull out or fall-out of the support arm out of the tubular members, particularly during axial adjustment of the support arms. Additionally, overtorquing during tightening of the screws holding the support arms could result in relatively costly repairs.

My prior U.S. Pat. No. 5,217,149 already proposed to integrate the attachment into a bicycle rack, and for that purpose suggested to connect the tubular members of the accessory by welding from below to the longitudinal frame members so that the support arms came to lie a distance below the load bearing surface formed by the frame itself.

SUMMARY OF THE INVENTION

It is an object of the present invention to provide a bicycle rack and bicycle rack accessory in the form of an attachment for existing racks which avoid by simple means the aforementioned shortcomings and drawbacks encountered in the prior art.

Another object of the present invention resides in a bicycle rack and bicycle rack accessory in the form of an attachment which prevents inadvertent complete axial pull-out of the support arms during adjustment or even loss thereof when the fastening members are not properly tightened.

A further object of the present invention resides in a bicycle rack and bicycle rack accessory in the form of an attachment which permits optimization of the materials used, yet enables simple, accurate and reliable assembly.

Still another object of the present invention resides in an adjustable bicycle rack utilizing the concept of axially extendable and rotatable support arms which is characterized by a particularly sturdy frame structure with an adjustable load-bearing surface lying in practically a single plane.

According to one feature of the present invention, the cross rail assemblies consist of several separately manufactured parts, i.e., of a main part forming a cross-rail with two interconnected tubular members and of two end caps made from a material different from that of the main part, whereby the end caps are secured in a particularly simple manner to the main part by spring pins which permits accurate and cost-efficient assembly.

According to another feature of the present invention, the support arms are each provided with a small annular bead near its insert end and of such a diametric dimension in relation to the diametric dimension of the opening in the end cap that the support arm can only be forced through this opening in the insertion as well as in the removal direction by the application of an extra axially directed force over and above the forces normally used for the adjustment of the more or less freely rotatable and freely axially movable support arm.

According to still a further feature of the present invention, the end caps and support arms are molded parts made from Delrin 100 while the remainder of the cross bar assembly and of the rack are made from extruded high tensile strength aluminum.

A further feature of this invention resides in the particular interconnection of a platform member with the frame members of the bicycle rack which provides a sturdy overall structure with a load-carrying surface that minimizes offsets in the load-carrying surface regardless of adjustment of the various parts thereof.

According to another feature of this invention, a triple bungee-type strap is provided to enhance the secure fastening of the object carried on the bicycle rack by cooperation with the looped ends of the support arms.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein:

FIG. 8 is a top plan view on an end cap of this invention with the thumb screw partially screwed in;

DETAILED DESCRIPTION OF THE DRAWINGS

Referring now to the drawing wherein like reference numerals are used throughout the various views to designate like parts, and more particularly to FIGS. 1 through 5, reference numeral 10 generally designates a bicycle rack whose frame includes a main strut generally designated by reference numeral 11 that consists of two substantially vertically extending main strut portions 12a and 12b on each side of the wheel whose lower ends are provided with enlarged eyelets 13a and 13b for connection to the bicycle in any conventional manner, for example, with the use of braze-ons or drop-in eyelets. The main strut 11 further includes at its upper end two short forwardly extending portions 14a and 14b interconnected by a cross portion 5 of slightly curved configuration which includes an upwardly raised section 15' in the center area thereof. The vertically extending main strut portions 12a and 2b thereby pass over into the forwardly extending portions 14a and 14b by way of curved portions with a relatively smaller radius while the forwardly extending portions 14a and 4b pass over into the cross portion 15 by way of curved portions with a relatively larger radius. The raised section 15' in the center area is for purposes of connection with a platform member 21 as will be explained more fully hereinafter. An auxiliary strut generally designated by reference numeral 6 includes two obliquely rearwardly upwardly extending strut portions 17a and 17b which are interconnected by means of a welded joint with the vertical main strut portions 12a and 12b at downwardly extending vertical strut portions 18a and 18b, welded to the vertical strut portions 12a and 12b shortly above the eyelet portions 13a and 13b. At the upper end, the two upwardly extending strut portions 17a and 17b are interconnected by a cross strut portion 19 as will be described more fully hereinafter.

The load-carrying surface generally designated by reference numeral 20 is formed in part by a rectangular platform member 21 which has a flat upper surface that is provided with downwardly extending ribs 21a, 21b, 21c and 21d (FIG. 4) located along the lateral edge areas and in the center area, respectively. At its rear end, the platform member 21 terminates in a part-circular portion 22 (FIG. 5) extending between the cross strut portion 19 and the rear interconnecting portion 29 interconnecting the two longitudinally extending frame members 25a and 25b. At its upwardly extending end, the platform member 21 terminates in an obliquely upwardly extending portion 23. The bicycle rack frame further includes the two longitudinally extending frame members 25a and 25b located on opposite sides of and spaced laterally from the platform member 21. The longitudinally extending members 25a and 25b are each provided with two depressed downwardly extending sections 26a, 26a'and 26b, 26b'(FIGS. 1 and 5) to accommodate the cross rail assemblies to be described hereinafter. At the forward end, the two longitudinal frame members 25a, 25b have upwardly extending portions 27a and 27b extending upwardly at an inclination of an angle about the same as that of the upwardly extending portion 23 of the platform member 21. The upwardly extending portions 27a and 27b are interconnected by a cross portion 28 whereby the longitudinal frame members 25a and 25b pass over into the upwardly extending portions 27a and 27b by way of curved portions with a relatively larger radius of curvature while the upwardly extending portions 27a and 27b pass over into the cross portion 28 by way of curved portions with a relatively smaller radius of curvature. The longitudinal frame members 25a and 25b are interconnected with each other by way of the rear cross member 29 passing over into the longitudinal members 25a and 25b by way of rounded off portions.

Figure 1:
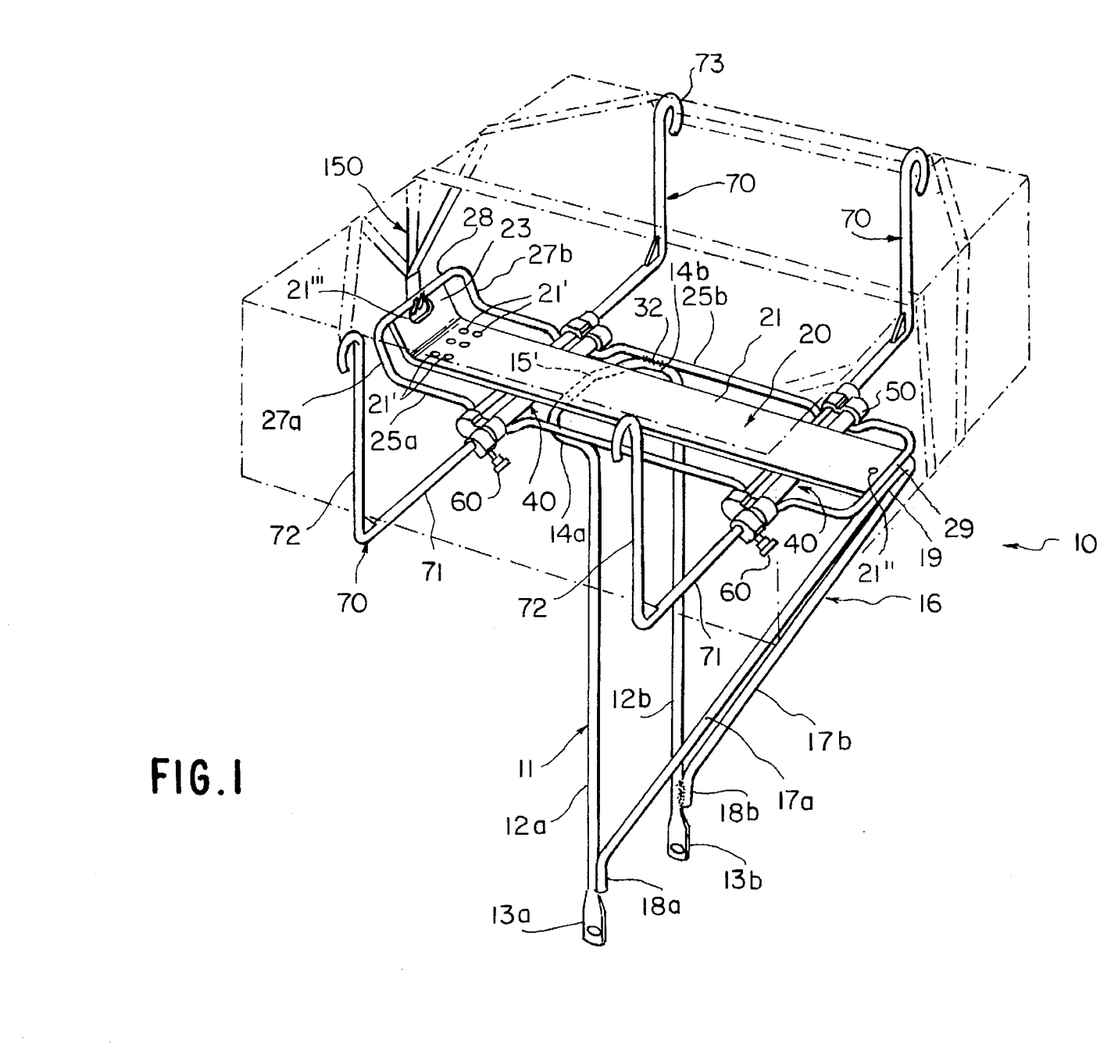
FIG. 1 is a perspective view of a bicycle rack in accordance with the present invention showing in dash-and-dotted lines a box-shaped item carried thereon and secured by a triple bicycle strap in accordance with the present invention.
Figure 2:
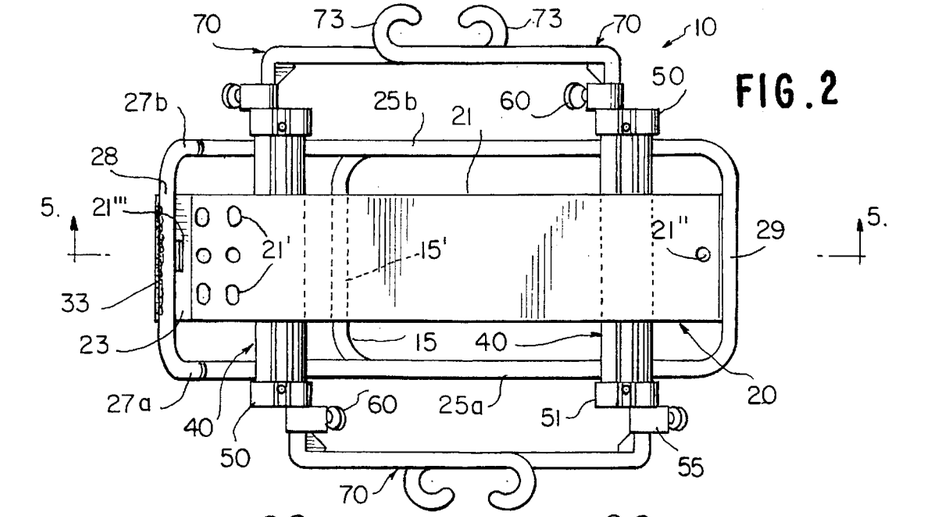
FIG. 2 is a top plan view on the bicycle rack of this invention with the support arms folded into the horizontal, retracted position.
Figure 3:
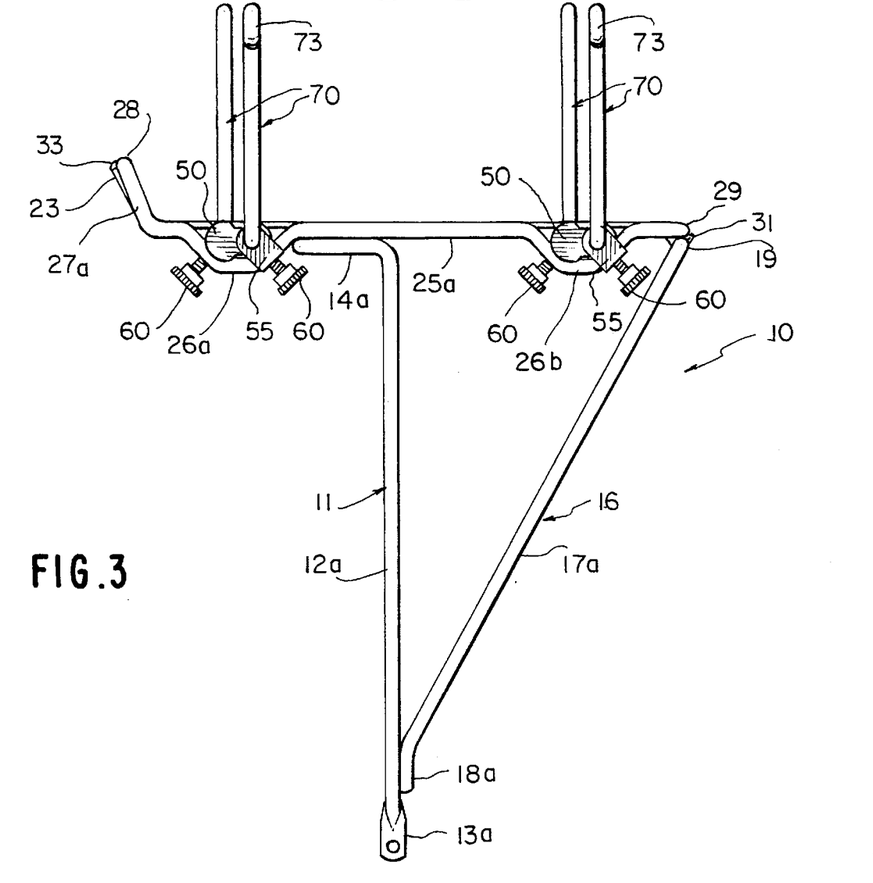
FIG. 3 is a side elevational view of the bicycle rack with the support arms rotated to extend up vertically.
Figure 4:
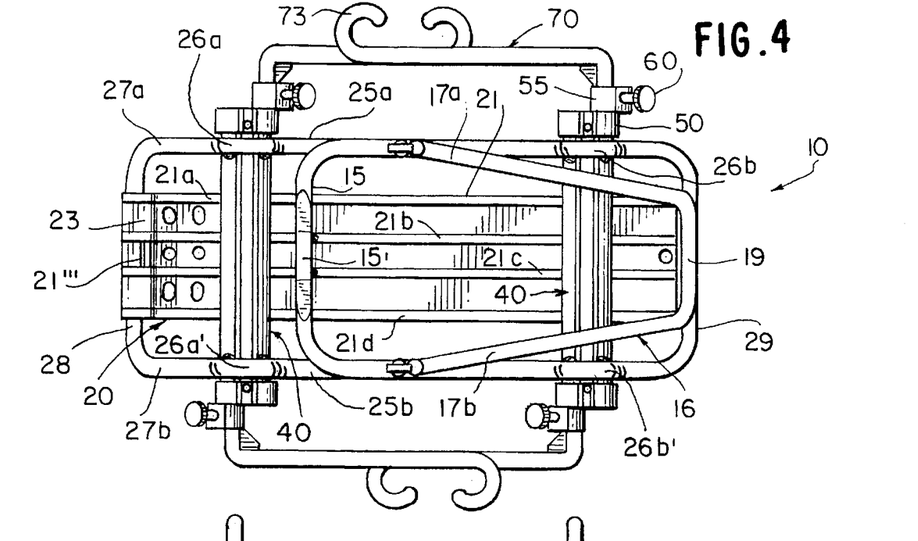
FIG. 4 is a bottom plan view on the rack of this invention.
Figure 5:
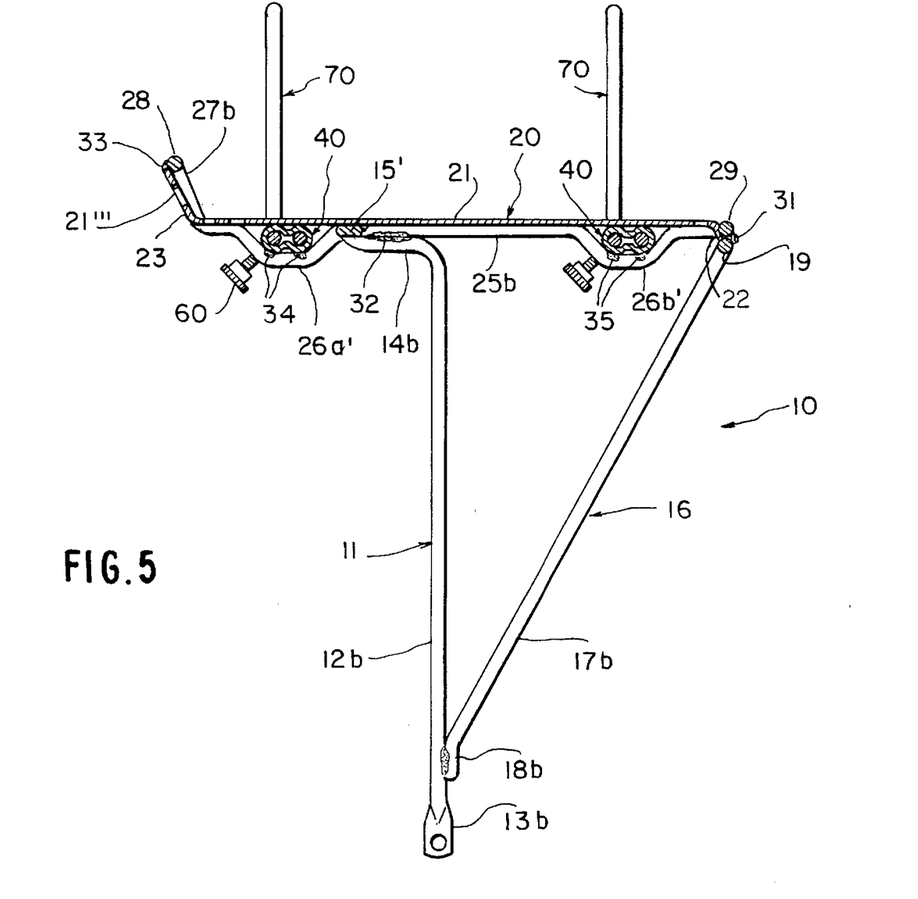
FIG. 5 is a longitudinal cross-sectional view through the bicycle rack of this invention taken along line 5—5 of FIG. 2.

The cross strut portion 19 is securely welded together with the part-circular end portion 22 of the platform member 21 and with the rear frame connecting portion 29 by means of a welded joint 31 extending over practically the entire length of the strut cross portion 19 while the short, forwardly extending strut portions 14a and 14b are connected with the longitudinal frame members 25a and 25b by welded joint connections 32 (FIG. 5). The upwardly extending end 23 of the platform member 21 is interconnected with the forward frame cross-connecting portion 28 at a welded joint 33 which extends over substantially the entire width of the upwardly extending end portion 23 of the platform member 21.

Figure 6:
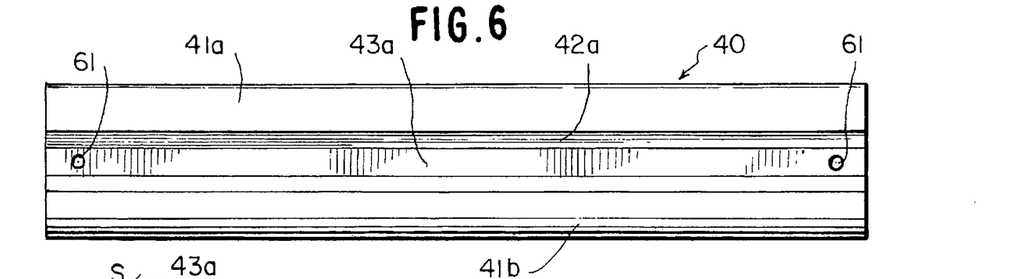
FIG. 6 is a plan view on a cross-rail assembly, by itself, as used in the bicycle rack of this invention.
Figure 7:
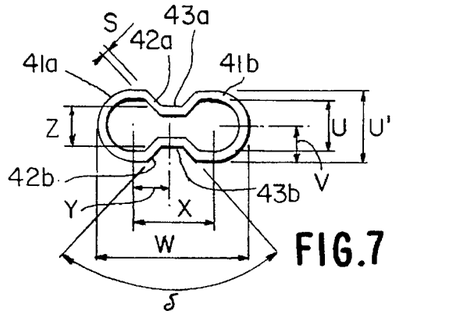
FIG. 7 is a side elevational view of FIG. 6.
Figures 10, 12:
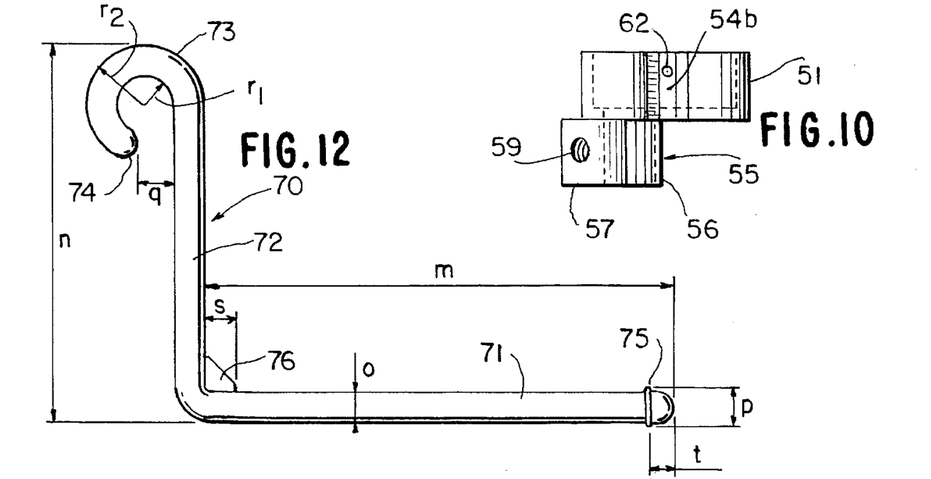
FIG. 10 is a bottom plan view on the end cap of FIGS. 8 and 9 with the thumb screw removed.
FIG. 12. is plan view of a support arm used in the bicycle rack of this invention.

Two longitudinally spaced cross-rail assemblies generally designated by reference numeral 40 are provided which are accommodated in the recessed sections 26a, 26b and 26a', 26b'of the longitudinal frame members 25a and 25b and are connected thereto by welded joints 34 and 35 (FIG. 5). Each cross-rail assembly 40 includes an extended main portion forming two hollow tubular portions 41a and 41b (FIG. 6) interconnected by upper and lower approximately V-shaped interconnecting portions 42a and 42b whose V-shape ends in a flat bottom portion 43a and 43b (FIG. 7). Each tubular portion 41a and 41b thereby forms substantially circular openings to accommodate the longer arm portion 71 of the support arms generally designated by reference numeral 70 (FIG. 12).

Figure 8:
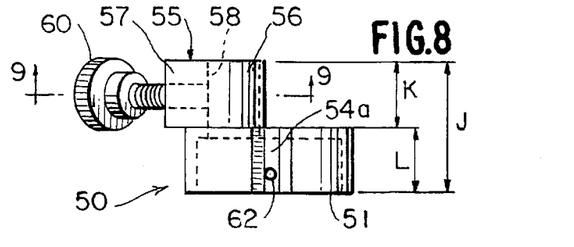
Figure 9:
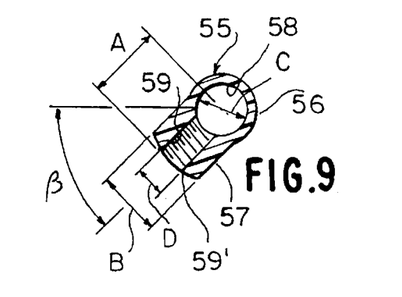
FIG. 9 is a cross-sectional view taken along line 9—9 of FIG. 8 with the thumbscrew removed.
Figure 11:
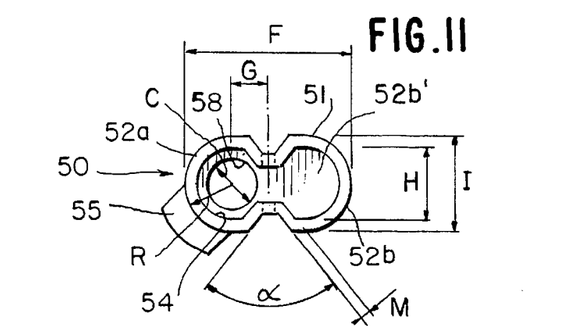
FIG. 11 is a front elevational view of the end cap as seen in FIG. 8.

Each cross-rail assembly 40 also includes two molded end caps generally designated by reference numeral 50 (FIGS. 8–10), each of which includes an inner part 51, i.e., facing the tubular portions 41a and 41b and adapted to be mounted and secured over the tubular portions as well as over their interconnecting portions 42a and 42b. The dimensions of the inner part 51 are thereby complementary to those of the tubular portions and of their interconnections to provide a firm seating such as obtained by the use of a press-fit. Additionally, each end cap 50 includes an outer part 55 integral, i.e., in one piece with the inner part 51 adjoining the inner part 51 on the side opposite the tubular portions 41a and 4lb and their interconnecting portions 42a and 42b. The outer part 55 consists of a semi-circular portion 56 terminating in a downwardly directed, approximately rectangular extension 57 as can be seen in FIGS. 9 and 11. The semi-circular portion 56 is provided with a through-opening 58 which is coaxial with the opening 54 (FIG. 11) in the inner part 51 and with the opening in the corresponding tubular portion and represents a continuation of the latter. The extension 57 is provided with a threaded bore 59 terminating at the inner end in opening 58 and at the outer end with a slightly flared portion 59'. A thumbscrew 60 is adapted to be screwed into the bore 59 to hold the support arm 70 in the selected position by tightening the screw 60. While the left side of the end cap as shown in FIG. 11 is open, the right side thereof is closed off by cross wall 52b'as the support arms 70 extend from a respective tubular member of a cross rail assembly on opposite sides thereof.

Figure 17:
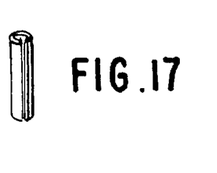
FIG. 17 is a perspective view of a spring pin used in the present invention.

As mentioned above, the end cap 50 is so shaped as to fit tightly over the ends of the tubular members 41a and 4b and interconnecting parts 42a, 42b and 43a, 43b. However, to assure secure fixing, each end cap 50 is additionally secured to the main part of the cross-rail assembly by a stainless spring pin (FIG. 17) which is forced into a correspondingly sized holes 61 (FIG. 6) extending through the center of the flat bottom portions 43a, 43b and holes 62 extending through the center of the flat bottom portions 54a, 54b.

Each support arm generally designated by reference numeral 70 (FIG. 12) is L-shaped including a longer arm portion 71 adapted to be axially and rotatably inserted into a corresponding tubular member as well as a shorter arm portion 72 which is disposed at a right angle to the longer arm portion and which, in turn, terminates in a loop portion 73 extending over more than 180°. To avoid sharp edges, the end of the loop portion is rounded off at 74. The longer arm portion 71 includes an annular bead 75 to prevent inadvertent axial pull-out or fall-out by appropriate dimensioning of the parts and selection of the materials as will be explained more fully hereinafter. Additionally, each support arm includes a gusset 76, molded integrally with the support arm and of the same material. The generally diagonal shape with short end portions terminating perpendicular to the respective support arm can be seen in FIG. 12.

Inadvertent axial pull-out or fall-out of a support arm 70 can be avoided by proper selection of dimensions and materials used for the parts. A typical set of dimensions which is set forth only for purposes of illustration and which may be varied as known to those skilled in the art is as follows. The length m (FIG. 12) of the longer arm portion 71 is about 7 inches and the length n of the shorter arm 72 is about 5¼ inches. The diameter of the shorter and longer arm portions is 0.365–0.370 inches while the diametric dimension p of the annular bead 75 is 0.385–0.378 inches with an external radius of about 1/16th of an inch. The spacing q from the end of the loop portion 73 to the shorter arm portion 72 should be chosen to be sufficient for one strap of the triple strap to go through easily and is typically about ½inch. The radius r1 of the loop portion 73 is about 0.375 and the radius r2 is about 0.750 inches. A radius of ⅜th of an inch is used for the larger radius of curvature interconnecting the longer arm portion 71 with the shorter arm portion 72 with a correspondingly smaller radius of curvature where the gusset 76 is connected. The distance s of the gusset 76 is about 0.4 inches. The distance t of the annular bead 75 from the free end of the longer arm portion 71 is about 0.237 inches. The dimension which in conjunction with dimension p plays a role in preventing inadvertent pull-out or falling out of the support arm 70 in the end cap is the diameter C of the through-opening 58 in the end cap 50 (FIG. 11). For the example described herein as non-limitative of the invention the diameter C is in the range of 0.373 inches–0.370 inches. However, for manufacturing reasons of the molded end cap 50, the through-opening 58 may be tapering from a diameter of 0.380 inches in the area of inner part 51 to a diameter range of 0.373 inches–0.370 inches near the outer end area of opening 58, i.e., near the upper area as viewed in FIG. 8, with a diametric dimension C preferably near the lower end of this range. Other typical values for the end cap 50 are as follows. The length A (FIG. 9) from the center of the bore C to the end of the extension 57 is about 0.585 inches while the dimension B thereof is about 0.483 inches. The diameter D of bore 59 is 0.204 inches and is provided with a ¼"-20 thread cut into the bore. The overall outside dimension F (FIG. 11) of the end cap 50 is 1.314 inches, the dimension G from the center of bore 58 to the center of the bottom portion 54a is 0.309 inches, the dimension M of the spacing from bottom portion 54a to bottom portion 54b is 0.447 inches, the outside height dimension I of the end cap is 0.697 inches, the overall axial length dimension J (FIG. 8) of the end cap is 0.969 inches, the axial length dimension K of the outer end cap part 55 is 0.500 inches and the axial length dimension L of the inner end cap part 51 is 0.469 inches. The radius R (FIG. 11) is 0.348 inches while the thickness M (FIG. 11) is 0.094 inches. With the use of Delrin 100 for both the end cap 50 and the support arm 70, the foregoing dimensions of a typical example described without being limitative of the invention, have proved highly successful in avoiding inadvertent axial pull off or fall out of the support arm 70 yet permitting replacement of an arm if damaged simply by the application of an additional force to remove or install a support arm. The diametric dimension of the tubular portions 41a and 41b are not as critical but should be chosen to permit more or less free rotation and axial adjustment of a support arm 70 without the need for undue force. A diameter U (FIG. 7) of about 0.385 inches is appropriate for that purpose. Additional typical non-limitative dimensions are as follows: height U'=0.51 inches; height V from the center of a hollow tubular member to the outside of the tubular member =0.25 inches; the overall width W of the main portion 40 =1.13 inches; the distance X from center to center of the two tubular members =0.62 inches; the distance Y=0.31 inches; the dimension Z=0.26 inches; the wall thickness S=0.06 inches and the angle δ=84.

The stainless spring pins (FIG. 17) are commercially available 7/16 inches ×3/32inches spring pins with bores 61 and 62 slightly smaller than the expanded dimension of the spring pin. The part most likely to be subjected to undue forces are the thumbscrews 60. For that reason, the thumbscrews 60 are made from nylon so that the threads thereof will strip before the threads cut into the threaded bore 59 of the end cap 50 made of molded Delrin will strip. If a person applies an unnecessarily large force to a thumbscrew 60, for example, by the use of pliers, it will first strip the threads on the thumbscrews which can then be readily replaced without any problem for the end caps or without requiring other major repairs or replacements. This is another important feature of the invention because it will permit ready repair in those instances where undue forces are applied to the thumbscrews 60.

Figure 18:
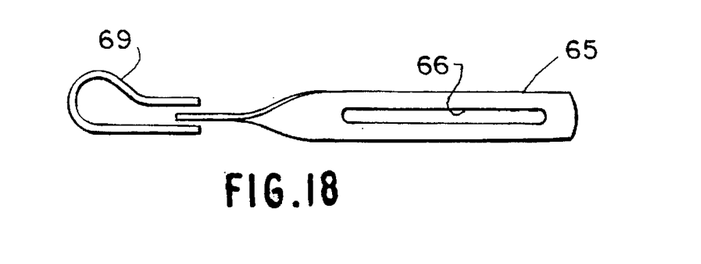
FIG. 18 is an elevational view of an extender.

To install a bicycle rack according to this invention, two extenders 65 (FIG. 18) are initially attached by screws and nuts in holes 21' of the platform member 21 and in the elongated openings 66 in the extenders 65. However, the screws and nuts are not yet tightened at this point. The struts 11 are then attached on the bike frame in a conventional manner by means of screws, though also not yet tightened. The extenders 65 are then attached to frame braze-on mounts by means of screws, bending the extenders if necessary by hand or with a wrench to align with the "braze-on" mounts. For bicycles without seat-stay braze-ons, "seat-stay" clamps 69 also shown in FIG. 18 may be used. The rack is then pivoted fore and aft to level the top of the rack whereupon all screws and nuts are securely tightened. A reflector bracket may then be installed by a screw and nut at the rear end of the platform member within opening 21".

To carry an object, all thumbscrews 60, if previously tightened, are to be released one-half turn, to release the support arms 70. This will enable the support arms to be slid gently out until they stop whereupon they can be rotated into the down position. The object to be carried is then placed on the rack and centered. Each arm 70 is then rotated to the upright position and each arm is then slid into the side of the object whereupon the corresponding thumbscrew 60 is tightened. One end of the triple rack strap 50 may then be attached to the front of the rack. A cut-out 2"' in the center area of the upwardly extending portion 23 is provided for that purpose. The cut-out 21"' may be of rectangular shape, of approximately rectangular shape with curved end portions or of a circular segment with the straight portion directed upwardly. The strap 150 is then extended over the top of the object and the other end is hooked to the rear of the rack in any appropriate place, depending on the size of the object. The two outside ones of the three straps are then looped in the hooks 73 of the arms 70 to hold the object in place. Criss-crossing from front to the rear may also be advantageous in some cases. However, any other use of the triple strap 150 depending on the nature of the object, may be used.

Figures 14, 15:
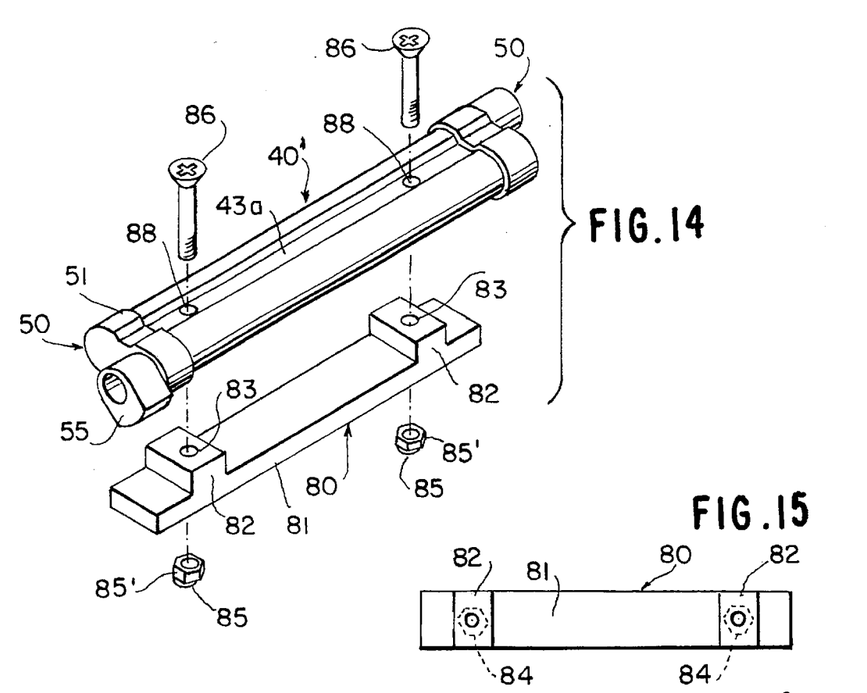
FIG. 14 is an exploded perspective view of a bicycle rack accessory in the form of an attachment utilizing a cross rail assembly similar to that shown in FIG. 6 in conjunction with a mounting bar.
FIG. 15 is a top plan view on the mounting bar used in the accessory of FIG. 14.
Figure 16:
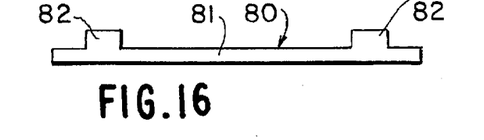
FIG. 16 is a side elevational view of the mounting bar of FIG. 15.

A bicycle rack accessory (FIGS. 14–16) in the form of an attachment includes, in addition to two cross-rail assemblies 40' with respective two interconnected tubular members 41a and 41b and two end caps 50 each, a mounting bar generally designated by reference numeral 80 which is also molded from ABS plastic or Delrin 100 and is of substantially rectangular configuration having a flat bottom portion 81 from which two raised reinforcing bosses 82 extend upwardly. A bore 83 extends through each boss 82 and flat bottom portion 81 whereby the lower portion of this bore 83 is in the form of a hexagonal opening 84 to receive the hexagonal portion 85' of a lock nut 85, such as a "Nylock" which cooperates with a flat phillips head screw 86 extending through bores 88 in the flat bottom portions 43a and 43b of the interconnection. As to the rest, the accessory including the cross rail assemblies and the support arms supported therein are the same as in connection with the bicycle rack of FIGS. 1–12 with the only difference of the holes 88 in the bottom parts 43a and 43b. For mounting the bicycle accessory, it is only necessary to separate the cross-rails from the mounting bars by unscrewing the two phillips head screws 86 in each cross-rail, laying the cross-rails across the top of a rack with the screws extending through holes 88. One front and one rear cross rail is placed on the frame of an existing bicycle rack which may be of any known type. The mounting bar 80 is then inserted under the top of the rack and aligned with its holes 83 with the phillips head screws 86 extending through holes 88. The cross rail assemblies and mounting bars are then screwed together but not yet tightened. The cross rails are then aligned parallel to each other whereupon the screws 86 are tightened. The accessory of the present invention thereby offers the same advantages as the bicycle rack of FIGS. 1–12 insofar as ease of manufacture, assembly and use is concerned.

For carrying an object, the same procedure may be followed as indicated hereinabove in connection with the bicycle rack of FIGS. 1–12.

The rack in accordance with the present invention which consists of extruded aluminum 6061-T6 frame members and extruded aluminum 6063-T6 cross-rail assemblies provides a very strong, enduring bicycle rack frame whose load surface is almost completely in one plane except for a minimal offset of the support arms which is kept exceptionally small by the particular arrangement described above.

Figure 13:
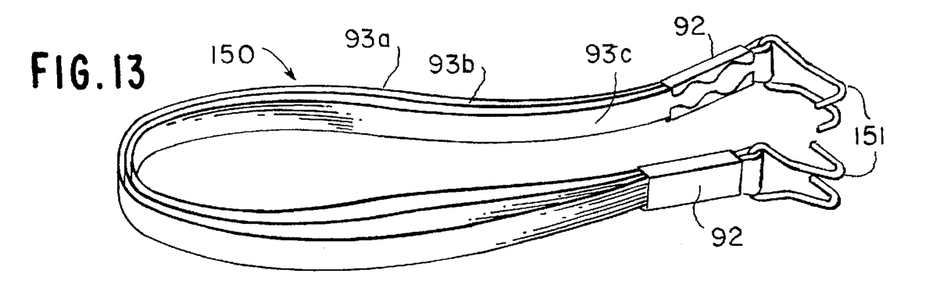
FIG. 13 a perspective view of a triple bicycle strap in accordance with the present invention.

FIG. 13 shows a triple rack strap generally designated by reference numeral 150 provided with hooks 151 for fastening the same to the bicycle rack and with crimped fasteners 92 to hold the triple straps 93a, 93b and 93c together. The use of a triple rack strap such as a triple bungee strap offers significant advantages with the bicycle rack as well as with the bicycle accessory of this invention as the outer straps can cooperate with the looped portions of the support arms in the manner described above to enhance the secure fastening and carrying of the object.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A bicycle rack having a longitudinal direction, comprising a first means forming a substantially planar load-carrying surface means extending in the longitudinal direction and including a platform member having a top-carrying surface, frame means having frame members extending substantially in the longitudinal direction, and second means for modifying at least one of size and configuration of the load-carrying surface means including cross rail assembly means extending substantially transversely to the longitudinal direction underneath said platform member, support arm means rotatable within said cross rail assembly means as well as axially adjustable within said cross rail assembly means in opposite directions, means for securing said support arm means in a preselected axial and rotatable position, and further means in said bicycle rack to support said cross rail assembly means on said longitudinally extending frame members in such a manner as to locate the maximum height of said cross rail assembly means substantially flush with the top-carrying surface.

2. A bicycle rack according to claim 1, further comprising force-responsive means for preventing inadvertent axial movement of the support arm means beyond a maximum axial extension by the presence of lower axial forces but enabling axial movement therebeyond by the presence of higher axial forces on said support arm means.

3. A bicycle rack according to claim 1, wherein a respective cross rail assembly means includes a pair of interconnected, longitudinally spaced hollow tubular members each open at least at one end to receive within-each tubular member a respective support arm means and end cap means fitting over the tubular members and defining said maximum height of the cross rail assembly means, and mechanical connecting means connecting the end cap means to the interconnected tubular members within the area of interconnection between the tubular members.

4. A bicycle rack according to claim 3, wherein each end cap means includes a first part of approximately reniform shape with two interconnected end-cap portions fitting over the ends of respective tubular members, one of said end-cap portions being provided with a through-opening in axial continuation of an open-ended tubular member, and a second part adjoining the first part, said second part being provided with a through-bore substantially continuing the hollow open-ended tubular member and including said securing means.

5. A bicycle rack according to claim 4, wherein said second part include an extension provided with a threaded bore receiving a threaded member for securing a respective support arm means in a preselected position thereof.

6. A bicycle rack according to claim 5, wherein at least said second part of the end cap means is made of a tougher material than the threaded member so that in case of overtorquing the threads of the threaded member will strip first.

7. A bicycle rack according to claim 6, wherein at least the second part of said end cap means is made from "Delrin" and said threaded member is made from Nylon.

8. A bicycle rack according to claim 6, wherein said extension extends downwardly at an angle in relation to the plane of said carrier surface means.

9. A bicycle rack according to claim 8, wherein said extension extends downwardly in a direction away from the other end-cap portion.

10. A bicycle rack according to claim 4, wherein the connection of said end-cap portions is recessed relative to the end cap portions, and wherein said mechanical connecting means is located within the recessed area of said connection.

11. A bicycle rack according to claim 3, wherein aligned bores are provided in the area of interconnection of each pair of interconnected tubular members, and wherein said mechanical connecting means includes a spring pin in said aligned bores.

12. A bicycle rack according to claim 1, wherein each cross rail assembly means includes a one-piece part forming two tubular members of substantially circular cross section open at each end and interconnected by an integral recessed connecting portion, and end cap means which has two end-cap portions also interconnected by an integral connecting portion, said end cap portions and the connecting portion thereof being of complementary configuration so as to fit over the tubular members and the connecting portions thereof and defining said maximum height of the cross rail assembly means of the cross rail assembly means.

13. A bicycle rack according to claim 12, further comprising mechanical connecting means located within corresponding areas of the connecting portions of the tubular members and of the end cap portions.

14. A bicycle rack according to claim 13, wherein said mechanical connecting means includes spring pin means extending through aligned bores of the connecting portions of said tubular members and of said end cap portions.

15. A bicycle rack according to claim 14, wherein the connecting portions of said tubular members and of said end cap portions are of complementary recessed configuration.

16. A bicycle rack according to claim 15, wherein said recessed configuration resembles a truncated cone.

17. A bicycle rack according to claim 8, wherein said extension extends downwardly at an angle of about 35° to about 70° in a direction away from the other end-cap portion.

18. A bicycle rack according to claim 4, wherein said first and second parts re made in one piece, and wherein the connecting portions of the end cap portions are recessed relative to the end cap portions, said mechanical connecting means being located within the recessed area of said connecting portions.

19. A bicycle rack according to claim 4, wherein said further means are formed by depressions in said longitudinal frame members of such a depth and length that a tangent to the top of the end cap portions substantially coincides with the plane of the carrier surface means.

20. A bicycle rack according to claim 1, wherein a respective support arm means includes two substantially L-shaped portions with a reinforcing gusset located in the corner of each L-shaped portion and formed integral therewith.

21. A bicycle rack according to claim 20, wherein said L-shaped support arm means is made in one piece with the gusset from Delrin.

22. A bicycle rack according to claim 1, wherein two such cross rail assembly means spaced from one another in the longitudinal direction and four support arm means are provided for each rack.

23. A bicycle rack according to claim 1, wherein said platform member includes an obliquely upwardly extending forward portion, the longitudinally extending frame members extending on both sides of the platform member and having obliquely upwardly extending forward frame portions interconnected by a cross frame portion welded to the upwardly extending forward portion of the platform member, strut means including strut members extending generally upwardly on both sides of said platform member toward said longitudinally extending frame members, said strut members terminating in short forwardly extending strut portions extending underneath and overlapped by corresponding sections of the longitudinal frame members, said short strut portions being welded to said longitudinal frame members within the area of overlap, said short forwardly extending strut portions being interconnected by a forward strut cross portion extending under and welded to the platform member in the area of a raised forward strut cross portion, and said strut means including rearwardly upwardly extending strut members interconnected by a rear cross strut portion, and the rear end of said platform member extending downwardly from in front thereof into an area of overlap of a rear cross-connecting frame portion connecting said longitudinal frame members and of the rear cross strut portion, and the rear end of said platform member being welded to both said rear cross strut portion and said rear cross connecting member within said area of overlap.

24. A bicycle rack according to claim 23, wherein the rear end of said platform member is of approximately part-circular shape extending between the rear cross strut portion and the rear cross-connecting frame portion.

25. A bicycle rack according to claim 23, wherein said longitudinal frame members are recessed within the area of each cross rail assembly means wherein each said cross rail assembly means are respectively welded to the recessed area.

26. A bicycle rack according to claim 25, wherein the depth of each recess in the longitudinal frame members corresponds substantially to the maximum height dimension of each cross rail means.

27. A bicycle rack according to claim 23 wherein said platform member is provided with longitudinally extending rib means, and wherein said forward cross strut portion is welded to at least some of said longitudinally extending rib means.

28. A bicycle rack according to claim 23, wherein said obliquely upwardly extending platform is provided with an opening for securing therein a securing strap.

29. A bicycle rack according to claim 23, further comprising extender means for securing the platform members to a bicycle including openings in the forward end area of the planar platform member to receive threaded fastening means.

30. A bicycle rack accessory for an existing bicycle rack with a frame means which enables modifying at least one of size and configuration of the carrier surface means, comprising cross rail assembly means to be placed across the frame means, each cross rail assembly means forming two tubular members interconnected by connecting portions and including end cap means with end cap portions fitting over the tubular members and interconnected by connecting portions fitting over the connecting portions of said tubular members, mounting bar means to be inserted under the frame means, threaded means for tightening a respective cross rail assembly means to a corresponding mounting bar means on opposite sides of said frame means to thereby secure said cross rail assembly means and mounting bar means to said frame means, two substantially L-shaped support arm means each having an inner leg portion rotatable within a respective tubular member and axially extendable from opposite ends of the tubular members, securing means in each end cap means for holding a respective support arm means in the selected position thereof, and further force-responsive means for preventing inadvertent axial movement of the support arm means beyond a maximum axial extension by the presence of lower axial forces but enabling axial movement therebeyond by the presence of higher axial forces.

31. A bicycle rack accessory according to claim 30, wherein each end cap means includes a first part of approximately reniform shape with two end-cap portions fitting over the ends of respective tubular members and interconnected by the connecting portions thereof, one of said end-cap portions being provided with a through-opening substantially continuing the opening in the tubular member, and a second part adjoining the first part, said second part being provided with a through-bore substantially extending the opening of the tubular member and including said securing means.

32. A bicycle rack accessory according to claim 31 wherein said second part includes an extension provided with a threaded bore receiving a threaded member for securing a respective support arm means in the preselected position thereof.

33. A bicycle rack accessory according to claim 32, wherein at least said second part of the cap means is made of a tougher material than the threaded member so that in case of overtorquing the threads of the threaded member will strip first.

34. A bicycle rack accessory according to claim 33, wherein at least the second part of said end cap means is made from "Delrin" and said threaded member is made from Nylon.

35. A bicycle rack accessory according to claim 33, wherein said extension extends downwardly at an angle and in a direction away from the other end-cap portion.

36. A bicycle rack accessory according to claim 35, wherein said connecting portions are recessed relative to the end cap portions and the tubular members, said mechanical connecting means being located within the recessed area of said connecting portions.

37. A bicycle rack accessory according to claim 36, wherein said mechanical connecting means is formed by aligned bores in said connecting portions and includes a spring pin in said aligned bores.

38. A bicycle rack accessory according to claim 37, wherein said recessed configuration resembles a truncated cone.

39. A bicycle rack accessory according to claim 30, wherein said further means includes an annular bead near the inner end of the support arm means having a diametric dimension slightly larger than the internal diametric dimension of a respective end cap portion, and the internal diametric dimension of a respective end cap portion being slightly smaller than the internal diametric dimension of a corresponding tubular member which is sufficiently large to firmly support the respective support arm means, yet permits substantially free rotating and axial movements of the support arm means.

40. A bicycle rack accessory according to claim 30, wherein each support arm means includes an outer leg with a looped hook portion at the outer end thereof which extends over an arc of more than 180°.

41. A bicycle rack accessory according to claim 40, further comprising a triple rack strap, one end of which is attached to the front end of the bicycle rack and after extending about the object(s) to be carried on the rack, is attached in the area of the rear end of the rack.

42. A bicycle rack accessory according to claim 41, wherein each looped hook portion extends over such an arc in excess of 180° that a spacing remains between the free end of the looped hook portion and an adjacent leg portion of the support arm means which permits the insertion of one strap of the triple rack strap, wherein each support arm means includes a reinforcing gusset in the corner defined at the junction of the inner and outer legs and wherein each said L-shaped support arm means is made in one piece with the gusset from Delrin.

43. A bicycle rack accessory according to claim 30, wherein two such cross rail means spaced from one another in the longitudinal direction and four support arm means are provided for each rack accessory.

44. A bicycle rack, comprising first means forming a substantially planar load-carrying surface means extending in the longitudinal direction, and second means for modifying at least one of size and configuration of the load-carrying surface means including cross rail assembly means extending substantially transversely to the longitudinal direction, support arm means rotatable within said cross rail assembly means as well as axially adjustable within said cross rail assembly means in opposite directions, means for securing said support arm means in a preselected axial and rotatable position, and force-dependent further means for preventing axial movement of the support arm means beyond a maximum axial extension by the presence of lower axial forces on said support arm means but enabling axial movement therebeyond by the presence of higher forces on said support arm means.

45. A bicycle rack according to claim 44, wherein a respective cross rail assembly means includes a pair of hollow open tubular members spaced in the longitudinal direction, and end cap means at each end of the tubular members having end cap portions fitting over the tubular members and continuing only one of the open tubular members.

46. A bicycle rack according to claim 45 wherein said further means includes an annular bead near the inner end of the support arm means having a diametric dimension slightly larger than the internal diametric dimension of a respective end cap portion, and the internal diametric dimension of a respective end cap portion being slightly smaller than the internal diametric dimension of a corresponding tubular member.

47. A bicycle rack according to claim 44, wherein each support arm means includes two substantially L-shaped leg portions with a looped hook portion which extends over an arc of more than 180°.

48. A bicycle rack according to claim 47, further comprising a triple rack strap, one end of which is attached to the front end of the bicycle rack and after extending about an object to be carried on the rack, is attached in the area of the rear end of the rack.

49. A bicycle rack according to claim 48, wherein the looped hook portion of a respective support arm means extends over such an arc in excess of 180° that a spacing remains between the free end of the looped hook portion and an adjacent support arm leg portion which permits the insertion of one strap of the triple rack strap.

50. A bicycle rack according to claim 44, wherein two such cross rail means spaced from one another in the longitudinal direction add four support arm means are provided for each rack.

51. A frame for a bicycle rack, comprising a substantially planar platform member having an obliquely upwardly extending forward platform portion, longitudinally extending frame members extending on both sides of the platform member and having obliquely upwardly extending forward frame portions interconnected by a cross frame portion welded to the upwardly extending forward portion of the platform member, strut means including strut members extending generally upwardly on both sides of said platform member toward said longitudinally extending frame members, said strut members terminating in short forwardly extending strut portions extending underneath and overlapped by corresponding sections of the longitudinal frame members, said short forwardly extending strut portions being welded to said longitudinal frame members within the area of overlap, said short forwardly extending strut portions being interconnected by a forward strut cross portion extending under and welded to the platform member along a raised part of the forward strut cross portion, said strut means further including rearwardly upwardly extending strut members interconnected by a rear cross strut portion, and the rear end of said platform member extending from in front and underneath a rear cross-connecting frame portion connecting said longitudinal frame members, and the rear end of said platform member being welded to both said rear cross-connecting frame portion as well as to the rear cross strut portion thereby providing at the same time a welded connection between the overlapping rear cross-connecting frame portion and the rear cross strut portion.

52. A frame according to claim 51, wherein the rear end of said platform member is of approximately part-circular shape extending between the rear cross strut portion and the rear cross-connecting frame portion from in front thereof.

53. A frame according to claim 51, further comprising cross rail assembly means welded to said longitudinal frame members and wherein said longitudinal frame members are recessed within the area of each cross rail assembly means which is welded thereto.

54. A frame according to claim 53 wherein the depth of each recess in the longitudinal frame members corresponds substantially to the maximum height dimension of each cross rail assembly means.

55. A frame according to claim 53, wherein said platform member is provided with longitudinally extending rib means, and wherein said forward cross strut portion is welded to at least some of said longitudinally extending rib means.

56. A frame according to claim 51, wherein said obliquely upwardly extending platform is provided with an opening for securing therein a securing strap.

57. A frame according to claim 51, further comprising extender means for securing the platform members to a bicycle including openings in the forward end area of the planar platform member to receive threaded fastening means.

58. A bicycle rack having a longitudinal direction, comprising frame means having frame members extending substantially in the longitudinal direction and in a substantially transverse direction, some of said substantially transversely extending frame members forming cross rail assembly means, a first means forming a substantially planar load-carrying surface means whose top-carrying surface defines the plane thereof and includes at least some of said frame members, second means for modifying at least one of size and configuration of the load-carrying surface means including said cross rail assembly means as well as support arm means which are rotatable within said cross rail assembly means and axially adjustable within said cross rail assembly means in opposite directions, said cross rail assembly means being supported on at least some of said substantially longitudinally extending frame members, means for securing said support arm means in a preselected axial and rotatable position, and further means to locate the maximum height of said cross rail assembly means substantially flush with said top-carrying surface, said further means including one recessed section in each longitudinal frame member for each cross rail assembly means supported thereon, and each recessed section extending downwardly from the plane of the top-carrying surface by a distance substantially corresponding to the maximum height of the cross rail assembly means.

* * * * *